United States Patent
Outwater et al.

(10) Patent No.: US 6,354,501 B1
(45) Date of Patent: Mar. 12, 2002

(54) COMPOSITE AUTHENTICATION MARK AND SYSTEM AND METHOD FOR READING THE SAME

(75) Inventors: Chris Outwater, Santa Barbara; Mark Helmick, Ventura, both of CA (US)

(73) Assignee: CrossOff Incorporated, Halifax ( * ) Notice: Subject to any disclaimer, the term of this patent is extended or adjusted under 35 U.S.C. 154(b) by 0 days.

(21) Appl. No.: 09/311,895

(22) Filed: May 14, 1999

Related U.S. Application Data

(60) Provisional application No. 60/108,956, filed on Nov. 18, 1998.

(51) Int. Cl.$^7$ .................................................. G06K 7/10
(52) U.S. Cl. ................... 235/462.01; 235/468; 235/494
(58) Field of Search ................................ 235/454, 457, 235/462.01, 462.26, 468, 470, 491, 494; 250/271

(56) References Cited

U.S. PATENT DOCUMENTS

| | | | | |
|---|---|---|---|---|
| 3,500,047 A | * | 3/1970 | Berry | ..................... 235/468 X |
| 3,654,463 A | | 4/1972 | Geusic et al. | |
| 3,858,977 A | | 1/1975 | Baird et al. | |
| 3,891,829 A | * | 6/1975 | Dobras | ................... 235/462.04 |
| 3,922,090 A | | 11/1975 | Fain | |
| 4,165,002 A | | 8/1979 | Meagher | |
| 4,186,020 A | | 1/1980 | Wachtel | |
| 4,359,633 A | | 11/1982 | Bianco | ...................... 235/468 |
| 4,387,112 A | | 6/1983 | Blach | |
| 4,442,170 A | | 4/1984 | Kaule et al. | |
| 4,452,843 A | | 6/1984 | Kaule et al. | |
| 4,598,205 A | | 7/1986 | Kaule et al. | |
| 4,605,846 A | | 8/1986 | Duret et al. | ................. 235/468 |
| 4,876,000 A | | 10/1989 | Mikhail | |
| 4,882,195 A | | 11/1989 | Butland | |
| 4,884,828 A | | 12/1989 | Burnham et al. | |
| 4,889,367 A | * | 12/1989 | Miller | .................... 235/468 X |
| 4,927,180 A | | 5/1990 | Trundle et al. | |
| 4,983,817 A | * | 1/1991 | Dolash et al. | ......... 235/462.04 |
| 5,083,814 A | | 1/1992 | Guinta et al. | |
| 5,106,125 A | | 4/1992 | Antes | |
| 5,139,812 A | | 8/1992 | Lebacq | |
| 5,169,222 A | | 12/1992 | Bollore et al. | |
| 5,172,937 A | | 12/1992 | Sachetti | |
| 5,194,289 A | | 3/1993 | Butland | |
| 5,206,490 A | * | 4/1993 | Petigrew et al. | ........ 235/468 X |
| 5,210,411 A | | 5/1993 | Oshima et al. | |
| 5,271,645 A | | 12/1993 | Wicker | |
| 5,306,899 A | * | 4/1994 | Marom et al. | .......... 235/454 X |

(List continued on next page.)

FOREIGN PATENT DOCUMENTS

| | | | |
|---|---|---|---|
| EP | 0 300 729 A2 | * | 1/1989 |
| JP | 11-175652 | * | 7/1999 |

OTHER PUBLICATIONS

International Search Report in PCT Application No. PCT/US00/13076 transmitted Aug. 21, 2000.

Primary Examiner—Karl D. Frech
Assistant Examiner—Jared J. Fureman
(74) Attorney, Agent, or Firm—Foley & Lardner

(57) ABSTRACT

A composite authentication mark includes a bar code portion that is visible when illuminated with visible light and an invisible code portion that is not visible when illuminated with visible light, wherein the bar code portion includes a plurality of bars and spaces and the invisible code portion is arranged in at least one of the spaces of the bar code portion without overlapping any of the bars of the bar code portion. Because the invisible code portion does not overlap with any of the bars of the bar code portion, a single-step printing and reading processes may be used. More information can be coded by the composite authentication mark by using the relative location of the invisible code portion within the spaces of the bar code portion.

23 Claims, 3 Drawing Sheets

U.S. PATENT DOCUMENTS

| | | |
|---|---|---|
| 5,331,140 A | 7/1994 | Stephany |
| 5,360,628 A | 11/1994 | Butland |
| 5,367,148 A * | 11/1994 | Storch et al. ............... 235/375 |
| 5,401,960 A * | 3/1995 | Fisun et al. ............. 235/468 X |
| 5,413,841 A | 5/1995 | Mahn, Sr. et al. |
| 5,446,267 A * | 8/1995 | Stanzani et al. ............ 235/440 |
| 5,447,335 A | 9/1995 | Haslop |
| 5,483,363 A | 1/1996 | Holmes et al. |
| 5,502,304 A | 3/1996 | Berson et al. |
| 5,514,860 A | 5/1996 | Berson |
| 5,525,380 A | 6/1996 | Paz-Pujalt et al. |
| 5,525,798 A | 6/1996 | Berson et al. |
| 5,542,971 A | 8/1996 | Auslander et al. |
| 5,554,842 A * | 9/1996 | Connell et al. .............. 234/491 |
| 5,569,317 A | 10/1996 | Sarada et al. |
| 5,583,489 A | 12/1996 | Loemker et al. |
| 5,599,578 A | 2/1997 | Butland |
| 5,611,958 A | 3/1997 | Takeuchi et al. |
| 5,612,529 A * | 3/1997 | Coleman ............. 235/62.26 X |
| 5,634,731 A | 6/1997 | Kita et al. |
| 5,667,317 A | 9/1997 | Tan |
| 5,674,698 A | 10/1997 | Zarling et al. |
| 5,698,397 A | 12/1997 | Zarling et al. |
| 5,701,538 A * | 12/1997 | Yasui ......................... 396/512 |
| 5,736,410 A | 4/1998 | Zarling et al. |
| 5,766,324 A | 6/1998 | Ikegaya et al. |
| 5,773,808 A * | 6/1998 | Laser ..................... 235/468 X |
| 5,815,193 A | 9/1998 | Clevinger |
| 5,861,618 A * | 1/1999 | Berson ...................... 235/468 |
| 5,867,586 A | 2/1999 | Liang |
| 5,895,073 A | 4/1999 | Moore |
| 5,917,925 A | 6/1999 | Moore |
| 5,959,296 A * | 9/1999 | Cyr et al. ............... 235/468 X |
| 5,978,118 A | 11/1999 | Flaherty |
| 6,006,991 A * | 12/1999 | Faklis et al. ........... 235/491 X |
| 6,028,306 A | 2/2000 | Hayashi |
| 6,039,257 A * | 3/2000 | Berson et al. .............. 235/468 |
| 6,106,110 A | 8/2000 | Gundjian et al. |
| 6,114,704 A | 9/2000 | Buck |

* cited by examiner

COMPOSITE AUTHENTICATION MARK AND SYSTEM AND METHOD FOR READING THE SAME

REFERENCE TO PROVISIONAL APPLICATION

This application claims the benefit of U.S. Provisional Application No. 60/108,956, filed Nov. 18, 1998.

BACKGROUND OF THE INVENTION

1. Field of the Invention

The invention relates generally to authentication marks or security marks and, more particularly, to a composite authentication mark having a bar code that is visible when illuminated with visible light and an infrared code that is visible when illuminated with infrared light but not visible when illuminated with visible light, and a device and method for reading the same.

2. Description of the Related Art

Various techniques have been used to identify articles in an effort to reduce counterfeiting. For collectibles such as art works and sports memorabilia, where a single item may be worth millions of dollars, a technique that is highly refined and virtually impossible to copy is desired. This is because high potential counterfeiting gains will motivate counterfeiters to invest large sums of money and resources to defeat the anti-counterfeit measure. Similarly, the high cost of implementing an anti-counterfeit measure for collectibles is typically accepted by the owner or insurer, because the potential loss from counterfeiting is great.

On the other hand, for mass produced items such as apparel, CDs, and audio and video cassettes, cost is a more important factor in implementing an anti-counterfeit measure. The implementation cost must be small enough so that the cost of the protected product will not increase dramatically. Yet, the anti-counterfeit measure must be refined enough so that counterfeiters will be unable to defeat the anti-counterfeit measure in a sufficiently easy manner such that they will be able to economically produce and sell counterfeit goods.

Mass produced items also have to be protected against product diversion. Product diversion occurs when a counterfeiter acquires genuine, non-counterfeit goods that are targeted for one market and sells them in a different market. The counterfeiter does this to circumvent the manufacturer's goal of controlling the supply of his or her goods in a particular market and, as a consequence, benefits from the sales in that limited supply market or in the diverted sales market.

In one type of anti-counterfeit and anti-diversion measure, an ultraviolet (UV) ink is used to mark the product with an identifying indicia. One benefit of using the UV ink is that it is typically not visible when illuminated with light in the visible spectrum (380–770 nm), but is visible when illuminated with light in the UV spectrum (200–380 nm). Therefore, counterfeiters will be unable to tell whether the product contains a security mark by merely looking at the product when the product is illuminated with visible light.

A number of UV inks are readily available in the security industry and can be obtained at a relatively low cost. Several UV ink types and compositions are described, for example, in U.S. Pat. No. 5,569,317, entitled "Fluorescent and Phosphorescent Tagged Ink for Indicia" the disclosure of which is incorporated by reference herein. This patent discloses a security mark that becomes visible when illuminated with UV light having a wavelength of 254 nm.

However, the use of security marks containing a UV ink has seen increased use and counterfeiters have become knowledgeable about their use. It has been a common practice for counterfeiters to examine the UV ink from a product sample, reproduce or procure the same or similar UV ink that matches the characteristics of the UV ink from the product sample, and apply the same security mark on the counterfeit products using the substitute UV ink.

In another type of anti-counterfeit and anti-diversion measure, an infrared (IR) ink is used to mark the product with an identifying indicia. As with the UV ink, one benefit of using the IR ink is that it is typically not visible when illuminated with light in the visible spectrum, but is visible when illuminated with light in the IR spectrum (800–1600 nm). An additional benefit of using the IR ink is that it is more difficult to reproduce or procure the matching IR ink by studying a product sample containing the IR security mark. Examples of IR security mark usage are given in U.S. Pat. Nos. 5,611,958 and 5,766,324, the disclosures of which are incorporated by reference herein.

Combination security marks have also been proposed. In U.S. Pat. Nos. 5,360,628 and 5,599,578, the disclosures of which are incorporated by reference herein, a security mark comprising a visible component and an invisible component made up of a combination of a UV dye and a biologic marker, or a combination of an IR dye and a biologic marker is proposed. Also, in U.S. Pat. No. 5,698,397, the disclosure of which is incorporated by reference herein, a security mark containing two different types of up-converting phosphors is proposed.

Combination bar codes have also been proposed in U.S. Pat. Nos. 5,502,304 and 5,542,971, the disclosures of which are incorporated by reference herein. These patents describe a combination bar code having visible and UV bar codes overlaid one on another and a system for illuminating and reading the same. U.S. Pat. No. 5,766,324 also discloses a combination bar code having visible and IR bar codes overlaid partially one on another.

In the combination bar codes described above, the process for printing the mark must be performed in two separate steps—a first step for printing the visible bar code and a second step for printing the invisible bar code. A single-step printing process cannot be used because the bars of the visible bar code overlaps the bars of the invisible bar code. In the same manner, the process for reading the mark is carried out in two separate steps—a first step for reading the visible bar code and a second step for reading the invisible bar code.

SUMMARY OF THE INVENTION

An object of this invention is to provide a composite authentication mark comprising a bar code portion that is visible when illuminated with visible light and an invisible code portion that is not visible when illuminated with visible light, wherein the bar code portion includes a plurality of bars and spaces and the invisible code portion is arranged in at least one of the spaces of the bar code portion without overlapping any of the bars of the bar code portion. Because the invisible code portion does not overlap with any of the bars of the bar code portion, a single-step printing and reading processes may be used. As an additional benefit, because the invisible code portion is arranged in one or more spaces of the bar code portion, the visible ink used to print the bars of the visible bar code portion does not interfere with the reading of the invisible bar code portion by absorbing the light that is used to illuminate and excite the invisible code portion.

The invisible code portion of the authentication mark according to the invention is an IR code. A UV code may be used, but the IR code is preferred more, because a comparable IR ink to duplicate the characteristics of the IR code is more difficult to procure and the IR code cannot be located with a diffuse light source.

Another object of the invention is to provide a composite authentication mark including a visible bar code having bars and spaces and an invisible code portion arranged within at least one of the spaces, wherein the particular location or locations of the invisible code portion within the spaces are used in decoding the authentication mark. With this arrangement, more information can be compressed into the authentication mark.

Still another object of the invention is to provide a bar code reading system that decodes an authentication mark including both a visible bar code portion and an invisible code portion using a single detector. The bar code reading system includes light sources for the visible and invisible codes, a detector for alternately detecting the visible light reflected from the authentication mark in response to illumination by the visible light source and the visible light emitted by the authentication mark as a result of fluorescence, and a control unit programmed to process the signals generated at the detector to decode the authentication mark.

Additional objects, features and advantages of the invention will be set forth in the description of preferred embodiments which follows.

BRIEF DESCRIPTION OF THE DRAWINGS

The invention is described in detail herein with reference to the drawings in which.

The accompanying drawings, which are incorporated in and constitute a part of the specification, illustrate presently a preferred exemplary embodiment of the invention, and, together with the general description given above and the detailed description of the preferred embodiment given below, serve to explain the principles of the invention.

DETAILED DESCRIPTION OF THE PREFERRED EMBODIMENT

Figure 1:
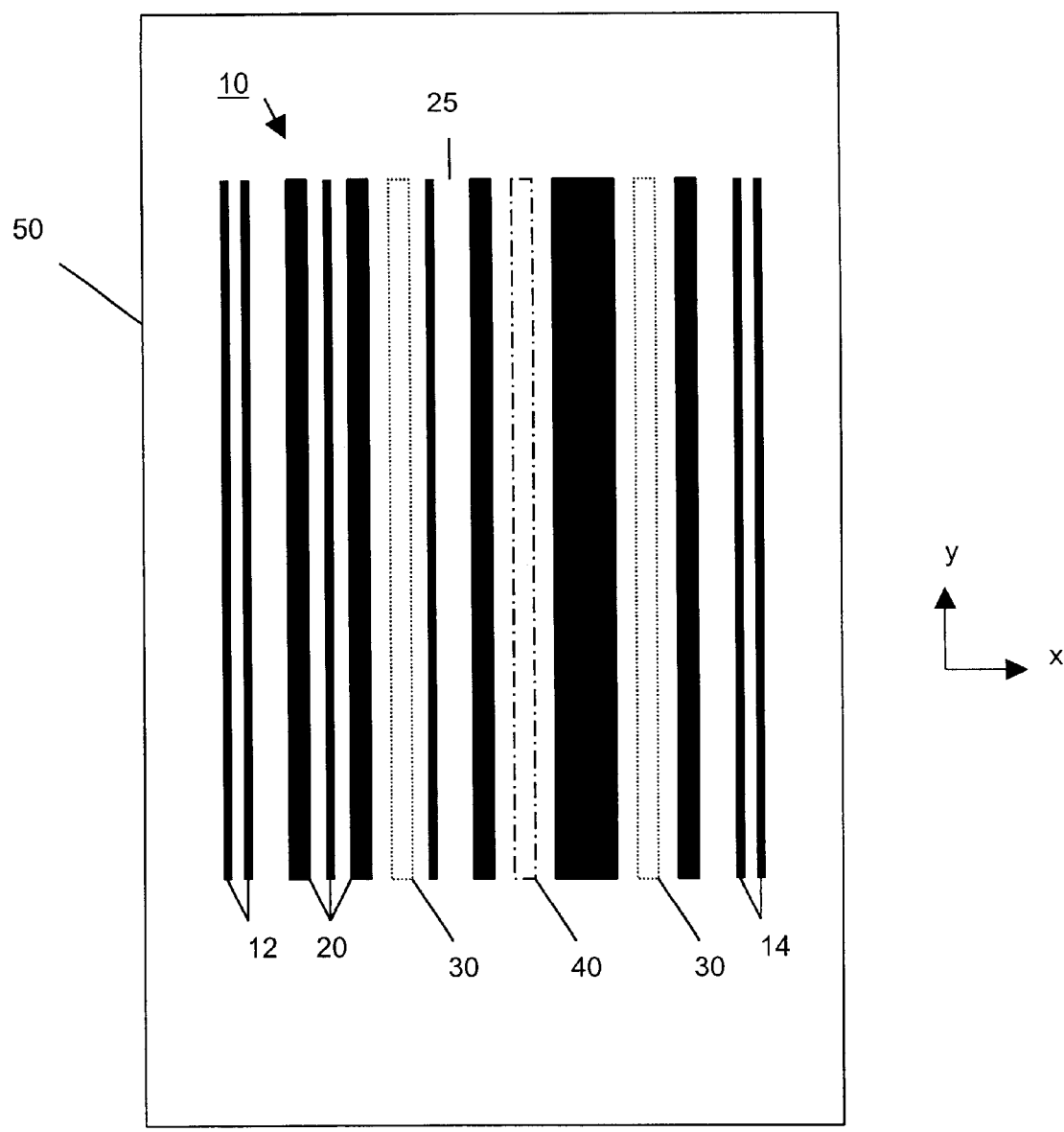
FIG. 1 is an illustration of the composite authentication mark according to the invention.

As shown in FIG. 1, a composite authentication mark 10 according to the invention includes a bar code portion including bars 20 and spaces 25 (collectively referred to as "features") and an infrared (IR) code portion represented by dotted rectangles 30. The IR code portion is considered to be "invisible" because it is not visible with the human eye when illuminated with light in the visible spectrum. Optionally, the mark 10 may also include a hologram portion embedded within the bar code which is illustrated with a rectangle 40 represented by dots and dashes. The holographic mark may also be separate from the bar code portion.

The bar code portion and the hologram portion of the mark 10 is visible to the naked eye under normal lighting conditions. However, the IR code portion is not visible to the naked eye under normal lighting conditions. The IR code portion becomes visible when placed under an IR light source. This occurs because the IR code portion is printed with an IR ink that contains an up-converting phosphor. These phosphors up-convert the IR radiation into the visible frequency spectrum. The up-converting phosphor of the preferred embodiment is an up-converting phosphor "PTIR545" which is available from Phosphor Technology Ltd. The IR ink is formed by mixing this up-converting phosphor with a binder resin, which may be any acrylic or urethane resin that is thermoplastic. In a preferred low cost embodiment, only small quantities of the up-converting phosphor are used to form the IR ink. In this embodiment, a diffuse IR light source will be unable to cause the IR ink to fluoresce. A concentrated IR laser source directed at the particular location of the IR code is necessary to produce fluorescence.

The bar code portion may be a coded indicia of 0's and 1's used for product or inventory control, such as a universal product code (UPC) or others well known in the art. For example, the bar code portion of the mark 10 may be a coded indicia (01000101) for a particular music album and the code may be printed on a compact disk (CD) containing the music album, or on the CD case.

The IR code and the hologram are added for security reasons. The hologram is visible to counterfeiters but is difficult to duplicate. The IR code offers additional layers of protection. First, the presence of the IR code will go undetected many times because it is invisible. Second, even if counterfeiters were looking for the IR code, it would be difficult for them to locate it, because it requires a painstaking effort of aiming a concentrated laser beam at all suspected locations. Third, it may be difficult for counterfeiters to duplicate the IR emitting characteristics of the IR ink, e.g., a green sparkle.

The IR code may also be used to code additional information about the underlying product. For example, the mark 10 contains 6 spaces between the two outside bars (not counting the bars of the start and stop codes—the two thin bars 12, 14 that begin and end the bar code). A binary code can be formed by the IR code so that a space having the IR ink is assigned a "1" and a space having no IR ink is assigned a "0". This binary code may represent, for example, the year of manufacture.

In FIG. 1, the mark 10 is shown with a hot stamping foil 50, which may be plastic, mylar, polypropylene, or polyester. The foil 50 is used to print the mark 10 onto an object. Prior to printing the mark 10, however, visible and invisible ink bands are coated onto the foil 50. It should be noted that the individual bands extend in the y-direction along the full length of the foil 50, but are only partially illustrated in FIG. 1 so that the mark 10 can be shown as it would look in its post-printed state. The visible ink band and the IR ink band are coated onto the foil 50 using a process that is commonly known as the Gravure process, but other types of rod coating or flexo-coating may be used. The band for the hologram image 40 is formed on the foil 50 in the conventional manner.

The foil 50 is placed in a hot stamping machine (not shown) above an object to be marked between a stamp and a plate of the hot stamping machine and pressed against the object by depressing the stamp against the plate. As a result, the bands of foil 50 are transferred to the object and an image corresponding to the mark 10 is formed on the object. This printing process is repeated by advancing the foil 50 and placing a new object to be marked between the stamp and the plate.

Offset printing may be used in a similar manner instead of the hot stamping. Other printing methods, e.g., thermal ribbon printing or ink jet printing, may be used to print the mark 10 but are preferred less when printing a large number of objects with the same authentication mark, because they are generally slower.

Figure 2:
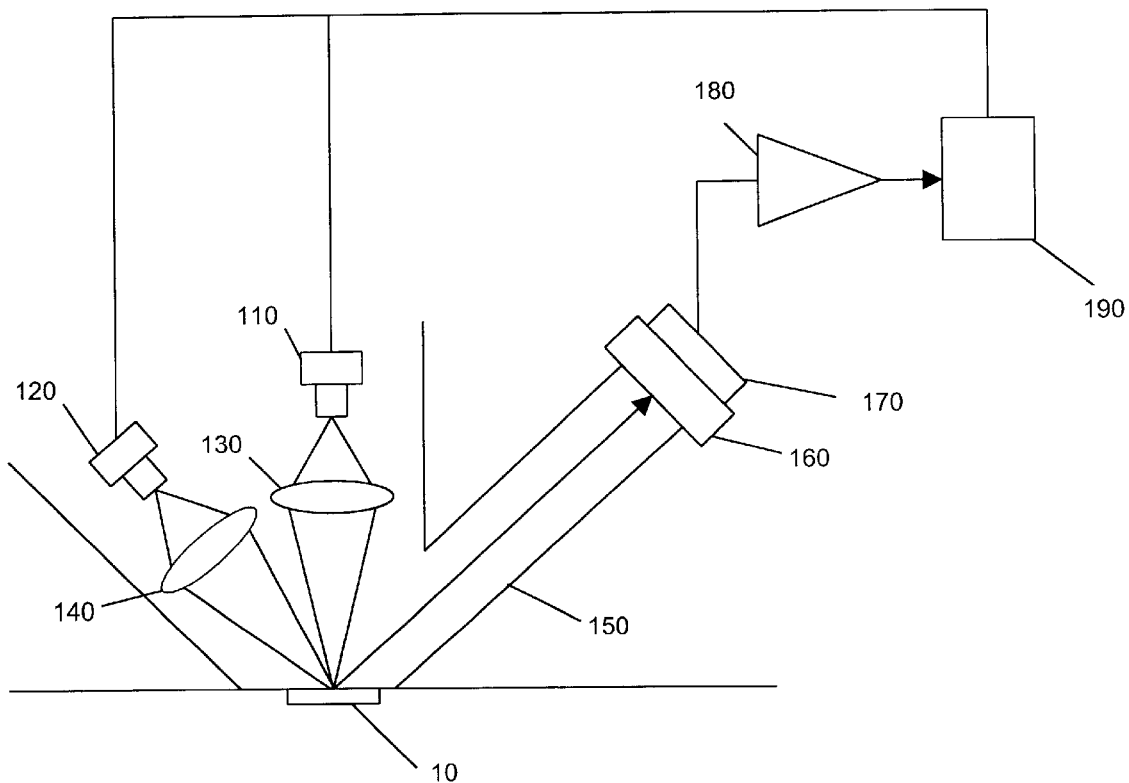
FIG. 2 is an illustration of a system for reading an authentication mark according to the invention.

FIG. 2 is an illustration of a system for reading the composite authentication mark according to the invention. The system comprises a light generating section, a light receiving section, and a signal processing section.

The light generating section includes a visible light source 110, an IR light source 120, e.g., 1N6266QT LED available from Quality Technologies, a first focusing lens 130 for the visible light source 110, and a second focusing lens 140, e.g., 300-0355-780 Lens available from Optima Precision, for the IR light source 120. The visible and IR light sources 110, 120 are flashed in an alternate manner. When the visible light source 110 is flashed during a first period of time, the IR light source 120 remains OFF during that period of time. On the other hand, when the IR light source 120 is flashed during a second period of time, the visible light source 110 remains OFF during that period of time. The second period is generally longer than the first period because the useful signal levels associated with the visible light emission from the IR code are much lower than the useful signal levels associated with the visible light reflections from the bar code. In the preferred embodiment, the flashing period of the visible light source 110 lasts 250 microseconds seconds and the flashing period of the IR light source 120 lasts 250 microseconds. The flashing rate or frequency for both is 2000/second. Different flashing rates may be used but such an arrangement is more complicated to implement. The flash ON-OFF cycles of the visible light source 110 and the IR light source 120 are complementary and repeated many times until the mark 10 has been completely read.

The first focusing lens 130 focuses visible light from the visible light source 110 onto a surface containing the mark 10, e.g., the surface of the CD or the surface of the CD case. The second focusing lens 140 focuses IR light from the IR light source 120 onto this same surface. The visible light and the IR light are focused at substantially the same spot so that the same portion of the mark 10 can be read. A certain amount of deviation of the focus spot is permitted along the length of the bar or space (y-direction) so long as the same bar or space is illuminated by both the visible light and the IR light. Because only one part of the mark 10 is illuminated by the visible light and the IR light at any one time, the mark 10 must be moved relative to the visible light and the IR light for all parts of the mark 10 to be illuminated. The movement may be manual as by hand or automatic as by a conveyor, but the speed of movement must be at a sufficiently slow speed to permit the feature of the bar code portion at each part of the mark 10 and the presence of the IR code portion at each part of the mark 10 to be determined.

The light receiving section includes a polished metal tube 150, preferably aluminum, an IR light blocking filter 160, and a detector 170. In one embodiment, the detector 170 is a silicon photodetector, e.g., PDB-O609-2 Detector available from Photonic Detectors, Inc., that detects light having wavelengths between 500 and 1100 nm, with a peak detection level between 900 and 1000 nm. The detector 170 produces electrical signals proportional to the detected intensity.

The tube 150 has a reflecting interior to collect the light reflected from or emitted by the mark 10. The IR light blocking filter 160 is provided because the light in the return path contains substantial amount of IR reflections when the mark is illuminated with the IR light. Without the filter 160, the useful signals that are generated at the detector 170 by the emitted light will be too small relative to the noise signals that are generated at the detector 170 by the reflections of the illuminating IR light. Also, the filter 160 is shown in FIG. 2 to be in intimate contact with the detector 170. Alternatively, the filter 160 may be positioned anywhere along the center optical axis of the metal tube 150.

In the preferred embodiment, the visible light source 110 is positioned to be above the mark 10 and the detector 170 is positioned diagonally (above and to the right by about the same distance) from the mark 10. This particular arrangement is chosen to reduce the glare from the visible light source 110 at the detector 170. The invention may be practiced with other arrangements of the visible light source 110 and the detector 170, so long as the glare from the visible light source 110 is not excessive at the detector 170.

The signal processing section includes an amplifier 180 and a microprocessor control unit 190. The amplifier 180 increases the level of the intensity signals generated at the detector 170 and supplies the amplified signals to the control unit 190. The control unit 190 processes the amplified intensity signal to decode the mark 10. The logic for decoding the mark 10 is illustrated in FIG. 3, and is described below.

The visible and IR light sources 110, 120 are modulated by the control unit 190 so that the visible and IR light are flashed at a predetermined frequency. Therefore, the amplified intensity signals must be demodulated at the control unit 190 at the predetermined frequency before the mark 10 can be decoded. If ambient light is not a problem, however, it is not necessary to flash the visible and IR light and so the control unit 190 need not demodulate the amplified intensity signals.

Figure 3:
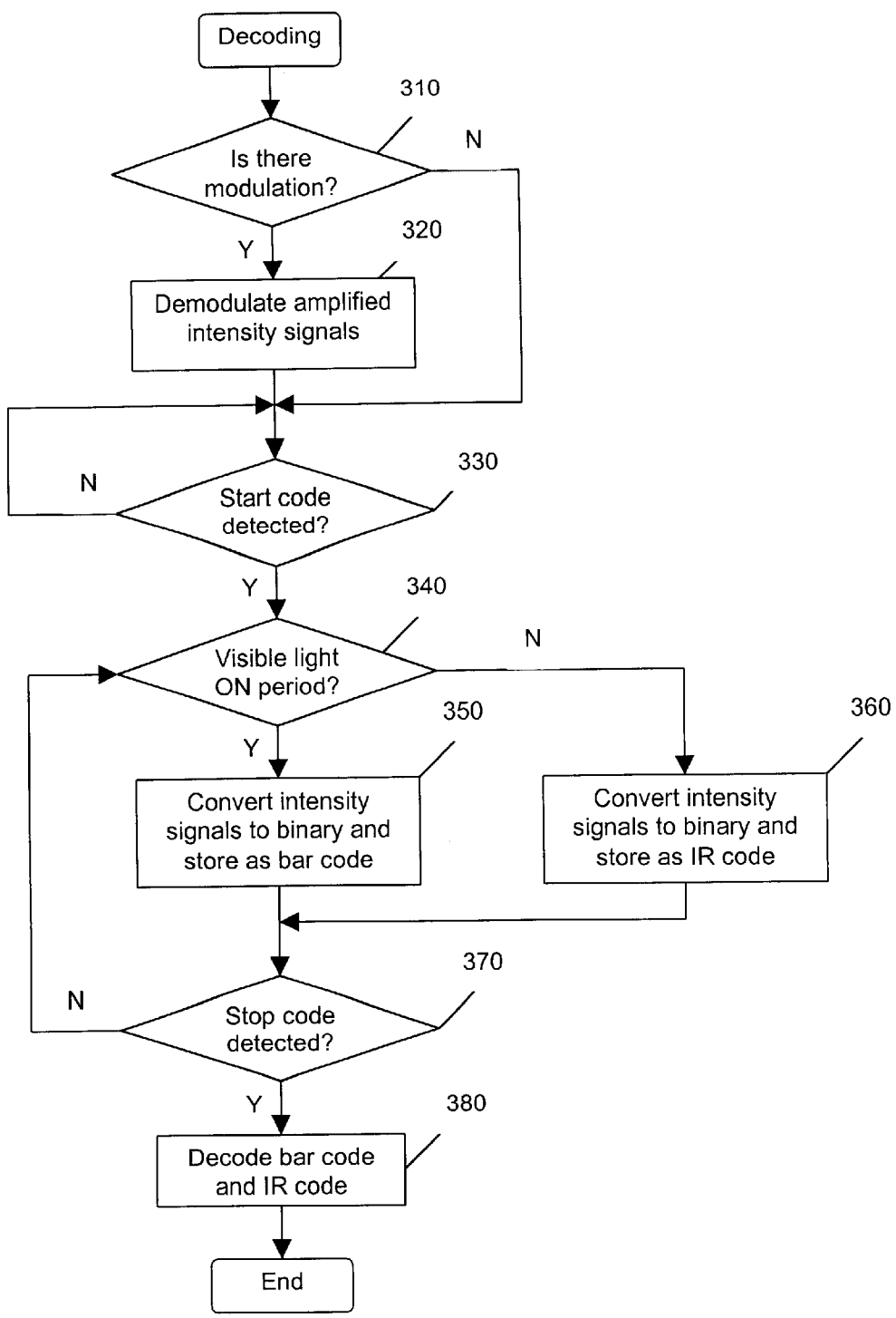
FIG. 3 is a flow diagram of the steps that are carried out to decode the composite authentication mark according to the invention.

FIG. 3 is a flow diagram of the decoding logic that is performed by the control unit 190 to decode the mark 10. In Step 310, the control unit 190 determines whether the illuminating light has been modulated. If not, the demodulation step (Step 320) is skipped. Then, the control unit 190 waits until it detects a start code in the intensity signals (Step 330). Once it finds the start code, it converts the intensity signals into a binary form of the bar code during the period when the visible light source 110 is ON (Steps 340 and 350) and converts the intensity signals into a binary form of the IR code during the period when the visible light source 110 is not ON (Steps 340 and 360). The conversion process is repeated until a stop code is detected in the intensity signals (Step 370) upon which the bar code and the IR code in their respective binary forms are decoded in Step 380.

The signal-to-noise ratio associated with the bar code portion is much higher than the signal-to-noise ratio associated with the IR code portion. Therefore, the bar code portion can be read at a much faster rate than the IR code portion. For this reason, a two-pass reading method may be desired, where the IR code portion does not need to be decoded and the presence of the IR code portion is determined for only randomly selected samples. In this two-pass reading method, objects bearing the mark 10 make a high-speed first pass during which the bar code portion is decoded and a selected number of these objects make a second pass, during which the presence of the IR code portion is determined.

While the embodiments described herein refers to bar codes in the form of bars and spaces, it is to be understood that bars and spaces need not e rectangularly shaped but could take on different shape and sizes wherein the dark (bars) and light (spaces) areas denote the code. For example, a visible mark formed of concentric rings of dark and light areas of different widths may be used. In the appended claims, these bars and spaces are intended to cover not only the traditional rectangular shaped areas, but also the more general shapes as well.

While particular embodiments according to the invention have been illustrated and described above, it will be clear that the invention can take a variety of forms and embodiments within the scope of the appended claims.

We claim:

1. An authentication mark placed on an object comprising a bar code portion that is visible when illuminated with visible light and an invisible code portion that is not visible when illuminated with visible light, wherein the bar code portion includes a plurality of bars and spaces and the invisible code portion is arranged in at least one of the spaces of the bar code portion without overlapping any of the bars of the bar code portion wherein the invisible code portion includes an infrared (IR) code formed with an IR ink that is visible when illuminated with an IR light and wherein the IR ink is of sufficiently low concentration so as not to be visible when illuminated with a diffuse IR light source but visible when illuminated with a concentrated IR laser source directed at the location of the IR code.

2. The authentication mark according to claim 1, further comprising a hologram portion arranged within or adjacent the bar code portion.

3. A method of applying an authentication mark having a bar code portion that is visible when illuminated with visible light and an invisible code portion that is not visible when illuminated with visible light, on an object that is placed between a stamp and a plate of a hot stamping machine, said method comprising the steps of:

supplying a hot stamping foil which has at least one band of infrared (IR) ink and a plurality of bands of visible ink, between the stamp and the plate on which the object is placed wherein the IR ink is of sufficiently low concentration so as not to be visible when illuminated with a diffuse IR light source but visible when illuminated with a concentrated IR laser source directed at the location of the IR ink; and pressing the stamp against the plate to imprint an image of the stamp on the object with the hot stamping foil.

4. The method according to claim 3, further comprising the step of advancing the hot stamping foil to imprint another object.

5. The method according to claim 4, further comprising the steps of applying the IR ink and the visible ink onto the hot stamping foil to form said at least one band of IR ink and said plurality of bands of visible ink.

6. The method according to claim 5, wherein the step of applying includes the step of mixing the IR ink with a resin binder and coating the resulting mixture on the hot stamping foil.

7. The method according to claim 3, further comprising the step of printing a hologram in at least one of the spaces of the bar code portion.

8. A method of reading an authentication mark comprising a first portion that is visible when illuminated with visible light and a second portion that is visible when illuminated with infrared (IR) light but not visible when illuminated with visible light said second portion containing an IR ink, wherein the IR ink is of sufficiently low concentration so as not to be visible when illuminated with a diffuse IR light source but visible when illuminated with a concentrated IR laser source directed at the location of the IR ink, said method comprising the steps of:

(a) repetitively exposing the authentication mark with a visible light beam during a first time period;

(b) repetitively exposing the second portion with an IR light beam from said concentrated IR laser source during a second time period;

(c) filtering IR light from the light that is returned from the authentication mark;

(d) detecting an intensity of the filtered light; and (e) detecting the first portion of the authentication mark based on the intensity of the filtered light detected during the first period, and the second portion of the authentication mark based on the intensity of the filtered light detected during the second period, wherein the steps (a) and (b) of repetitively exposing are carried out automatically.

9. The method according to claim 8, wherein the second period is subsequent to the first time period.

10. The method according to claim 9, wherein the second period is longer than the first time period.

11. The method according to claim 8, wherein the step (c) of detecting includes the step of producing signals proportional to the detected intensity and the step (d) of detecting includes the step of amplifying the signals proportional to the detected intensity.

12. The method according to claim 11, further comprising the step of modulating the visible light beam and the IR light beam at a predetermined frequency, and the step (d) of detecting includes the step of demodulating the amplified signals at the predetermined frequency.

13. The method according to claim 8, wherein the step of exposing includes the step of focusing the visible light beam and the IR light beam at the authentication mark.

14. The method according to claim 13, further comprising the step of moving the authentication mark relative to the visible light beam and the IR light beam so that different parts of the authentication mark are exposed by the visible light beam and the IR light beam.

15. The method according to claim 8, wherein the first portion comprises a bar code and the second portion comprises an IR mark within the bar code.

16. The method according to claim 15, further comprising the step of decoding the authentication mark based on the bar code and the location of the IR mark relative to the bar code.

17. A system for reading an authentication mark comprising a bar code portion that is visible when illuminated with visible light and an infrared (IR) code portion that is visible when illuminated with IR light but not visible when illuminated with visible light wherein the IR code portion contains IR ink, wherein the IR ink is of sufficiently low concentration so as not to be visible when illuminated with a diffuse IR light source but visible when illuminated with a concentrated IR laser source directed at the location of the IR code portion, said system comprising:

a visible light source;

said concentrated IR laser source;

a first lens positioned to focus visible light from the visible light source onto a surface containing the authentication mark;

a second lens positioned to focus IR light from the IR light source onto the surface containing the authentication mark;

an IR light blocking filter positioned to receive visible and IR light reflected from the surface and to pass through IR-filtered light;

a detector positioned to receive the IR-filtered light, the detector generating a signal that is proportional to an intensity of the IR-filtered light; and a control unit connected to the detector and programmed to decode the authentication mark based on signals generated from the detector as the authentication mark is scanned by the visible light source and the IR light source.

18. The system according to claim 17, further comprising an amplifier connected between the detector and the control unit for amplifying the detector signal to produce amplified intensity signals.

19. The system according to claim 18, wherein the control unit is programmed to control the visible light source to alternately emit visible light modulated at a predetermined frequency and the IR light source to emit IR light modulated at the predetermined frequency for a plurality of cycles until the authentication mark has been scanned by the visible light source and the IR light source, each cycle including a first period during which the visible light is emitted at the predetermined frequency and a second period during which the IR light is emitted at the predetermined frequency.

20. The system according to claim 19, wherein the second period is longer than the first period.

21. The system according to claim 20, wherein the control unit is programmed to determine features of the bar code portion based on the amplified intensity signals produced during the first periods of the plurality of cycles and to determine a presence of the IR code portion based on the amplified intensity signals produced during the second periods of the plurality of cycles.

22. The system according to claim 21, wherein the control unit is programmed to decode the IR code portion based on the location of the IR code portion relative to the features of the bar code.

23. An authentication mark placed on an object comprising a visible code portion and an invisible code portion, wherein the visible code portion includes a plurality of dark and light areas and the invisible code portion is arranged within or adjacent to the visible code portion without overlapping any of the dark areas of the visible code portion, and wherein the invisible code portion is arranged with respect to the visible code portion such that an illumination source for reading the authentication mark intersects all of the dark and light areas of the visible code portion and the invisible code portion with a single linear scan of the authentication mark wherein the visible code portion comprises a bar code and the invisible code portion comprises an infrared (IR) mark and wherein the IR mark is made of IR ink and wherein the IR ink is of sufficiently low concentration so as not to be visible when illuminated with a diffuse IR light source but visible when illuminated with a concentrated IR laser source directed at the location of the IR mark.

* * * * *